United States Patent

[11] 3,609,753

| [72] | Inventor | Scato Albarda<br>Emmasingel, Eindhoven, Netherlands |
| --- | --- | --- |
| [21] | Appl. No. | 791,458 |
| [22] | Filed | Jan. 15, 1969 |
| [45] | Patented | Sept. 28, 1971 |
| [73] | Assignee | U.S. Phillips Corporation<br>New York, N.Y. |
| [32] | Priority | Jan. 23, 1968 |
| [33] | | Netherlands |
| [31] | | 6801010 |

[54] DISPLACEMENT-MEASURING DEVICE
4 Claims, 3 Drawing Figs.

| [52] | U.S. Cl. | 340/347 AD |
| --- | --- | --- |
| [51] | Int. Cl. | H03k 13/02 |
| [50] | Field of Search | 340/347;<br>250/219 A, 210 |

[56] References Cited

UNITED STATES PATENTS

| Re. 26,252 | 8/1967 | Jones | 340/347 |
| --- | --- | --- | --- |
| 2,765,459 | 10/1956 | Winter | 340/347 |
| 3,265,902 | 8/1966 | Wingate | 340/347 X |
| 3,382,366 | 5/1968 | Johnson | 250/219 |
| 3,471,852 | 10/1969 | Floyd | 340/347 |
| 3,487,400 | 12/1969 | Ludewig, Jr. et al. | 340/347 |

Primary Examiner—Maynard R. Wilbur
Assistant Examiner—Jeremiah Glassman
Attorney—Frank R. Trifari ABSTRACT: The output terminals of a discriminator for resolving the output of a pair of scanners in two separate pulse series each corresponding in frequency to the displacement of a scanned object are coupled through an OR gate into a rectifier. The rectifier provides an enabling output during such displacement to circuit for adjusting the effective output of the scanners.

DISPLACEMENT-MEASURING DEVICE

The invention relates to a device for measuring the magnitude and sense of displacements of an object movable relative to a further object by means of at least two scanning members fastened at a given distance from each other to one of said objects. Upon a relative displacement of the objects relatively phase-shifted alternating signals are produced by the scanning members which are each applied to a difference amplifier followed by a square wave signal shaper. A discriminator in which the signals emanating from the signal shapers are converted into forward- or backward-counting pulses is provided. Such devices are known and they may be termed displacement devices comprising static pickups, since in a standstill the signals from the scanning members are DC signals. They are frequently employed for measurements on machine tools and the like. In this case at least two, but preferably four scanning members are used, the output signals of which are pairwise combined in difference amplifiers so that any asymmetry of the signals is at least partly eliminated. The scanning members may be optophotoelectric, inductive or capacitive scanning members. Asymmetry of the signals of the scanning members gives rise to measuring errors subsequent to the further processing of these signals after the signal shapers in the discriminator and may even cause complete disappearance of the signals. The asymmetry is due to temperature fluctuations and aging of the scanning members, for example, the temperature-dependent dark current and the temperature- and age-dependent sensitivity of photocells in optophotoelectric scanning members and furthermore to soiling of the measuring rules on the machine tool and to variations of the brightness of the lamp.

In practice it is found that the known devices are not capable of providing a complete and reliable elimination of the asymmetry. Due to relatively different characteristics of the scanning members, particularly in the case of photocells, troublesome errors occur. The device according to the invention obviates this disadvantage and is characterized in that it comprises a rectifying circuit followed by comparison circuits. The counting pulses of the discriminator, rectified in the rectifying circuit, controls the comparison circuits. In each of comparison circuits the symmetry of a square wave signal from a square wave signal shaper is determined. In the event of asymmetry a control signal is produced which is applied to means for varying a reference setting signal of the scanning member. The whole or partial asymmetry cannot simply be determined by smoothing of the scanning signal in a low band-pass filter and by comparison with half the value of the peak voltage of a resultant square wave signal, because the signal depends upon the location of the scanning members (static pickup) and may therefore maintain a given value for a long time. Then local signal states could unjustly be conceived to be asymmetrical, which would result in an undesired adjustment of the scanning member.

In the device according to the invention the counting pulses at the output of the discriminator should therefore have a repetition frequency which is sufficiently high to provide the certainty that the real asymmetry of the scanning signals is concerned instead of a signal state varying with the location of the scanning members as stated above. In the device according to the invention this is simply carried out by causing the rectified counting pulses to control the comparison circuits. The frequency of the counting pulses has to be sufficiently high for producing at the output of the rectifier a control voltage which is effective for the comparison circuits. In the event of asymmetry of a scanning signal, the asymmetry is also manifest in the square wave signal via the square wave signal shaper. The square wave signal is applied to a comparison circuit. The comparison circuit produces at its output a signal which is employed as a control signal for the reference setting of the scanning member. The reference setting voltage or current of the scanning member is thus varied so that a symmetrical output signal is obtained. The means for varying said reference setting current or voltage may be formed by a potentiometer whose cursor is driven by a motor controlled by the control signal.

When the measuring scales at the relatively movable objects are soiled, a comparatively rapidly varying asymmetry of the scanning signal will occur at the passage along said soiled places. A rapid control of the reference setting signal is then required. For this purpose the control signal of a comparison circuit in a further embodiment of the device is capable of controlling a forward and backward counter, the position of which provides the desired reference setting signal through a digital-analogue converter. It should be noted that with devices according to the invention in general two scanning members instead of four will suffice. According to the invention it is not necessary to use such a combination of scanning signal pairs that part of the asymmetry is eliminated in advance. The devices according to the invention provide adequate elimination of the asymmetry for each scanning member.

The invention will be described more fully with reference to the drawings.

In the drawing.

Corresponding parts are designated in the figures by the same reference numerals.

Figure 1:
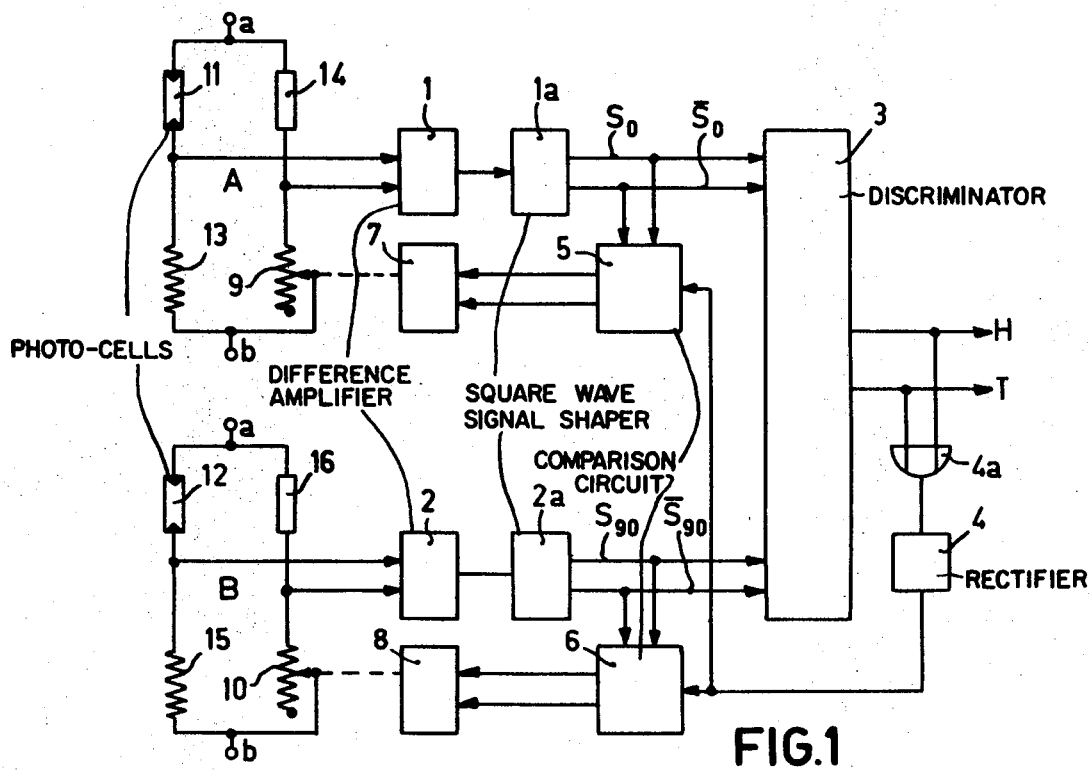
FIG. 1 shows a first embodiment of the invention.
Figure 3:
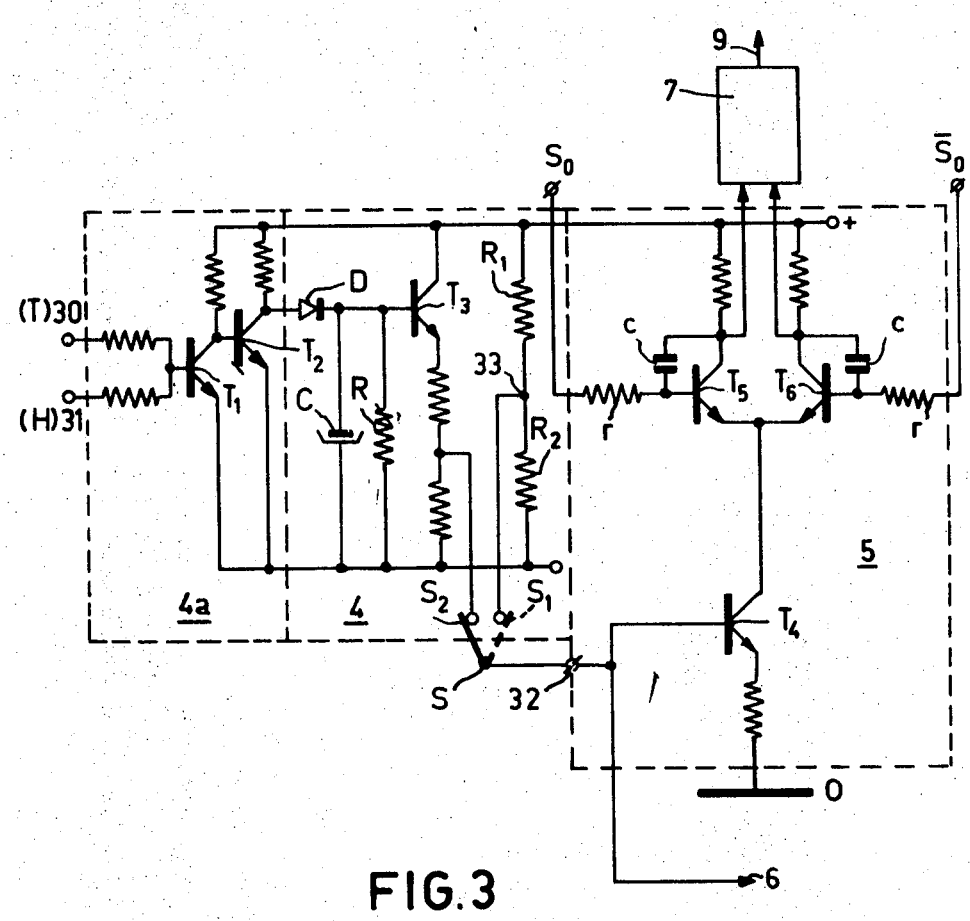
FIG. 3 shows a detail of the device embodying the invention.

Referring to FIG. 1, reference numerals 11 and 12 designate photoelectric cells of an optoelectric shift-measuring instrument, the measuring scales and the optical system of which are not shown. The photocells 11 and 12 are included each in a bridge A and B respectively. The bridge A comprises furthermore a resistor 13, a resistor 14, which may also be a photocell, and a potentiometer 9. The bridge B comprises, in addition, a resistor 15, a resistor 16, which may also be a photocell, and a potentiometer 10. The bridges are connected to terminals $a$ and $b$ of a voltage source (not shown). The output terminals of the bridge A are connected to the inputs of a difference amplifier 1, followed by a square wave signal shaper 1a. The shaper 1a supplies the square wave scanning signals $S_o$ and $\overline{S}_o$, which are applied to a discriminator 3. The output terminals of the bridge B are connected to the inputs of a difference amplifier 2, followed by a square wave signal shaper 1a. The shaper 1a supplies square wave scanning signals $S_{90}$ and $\overline{S}_{90}$, which are also applied to the discriminator 3. In the discriminator 3 the signals $S_o$, $\overline{S}_o$, $S_{90}$ and $\overline{S}_{90}$ are converted by means of a logical network into forward- and backward-counting pulses at the terminals H, T in accordance with the direction of displacement. Such a discriminator is described in U.S. Pat. No. 3,543,167 (FIG. 3). The forward- and backward-counting pulses are applied through an OR gate 4a to a rectifying circuit 4. With adequately high frequency of the forward- or backward-counting pulses the rectifying circuit 4 supplies a control signal for the comparison circuits 5 and 6. The comparison circuit 5 receives the signals $S_o$ and $\overline{S}_o$ to be compared with each other, subsequent to filtering in a low band-pass filter. The comparison circuit 6 receives the signals $S_{90}$ and $\overline{S}_{90}$ to be compared with each other, subsequent to filtering in a low band-pass filter. In the event of a difference between the mean values, that is to say in the event of asymmetry of the $S_o$, $\overline{S}_o$ and $S_{90}$, $\overline{S}_{90}$ signals respectively, a control signal appears, in accordance with the direction of the asymmetry, at one of the outputs of the comparison circuits 5 or 6 respectively. The comparison circuit 5 is connected to a motor 7 and the comparison circuit 6 is connected to a motor 8. The motors are controlled by the control signals. The motor 7 drives the cursor of the potentiometer 9 and the motor 8 drives the cursor of the potentiometer 10. The control signals thus determine via the motors 7 and 8 the positions of the potentiometers 9 and 10 respectively. In this way the respective bridge settings are changed so that the reference-setting voltages for the photocells 11 (and 14, if any) and 12 (and 16, if any) change, so that the asymmetrics are eliminated.

Figure 2:
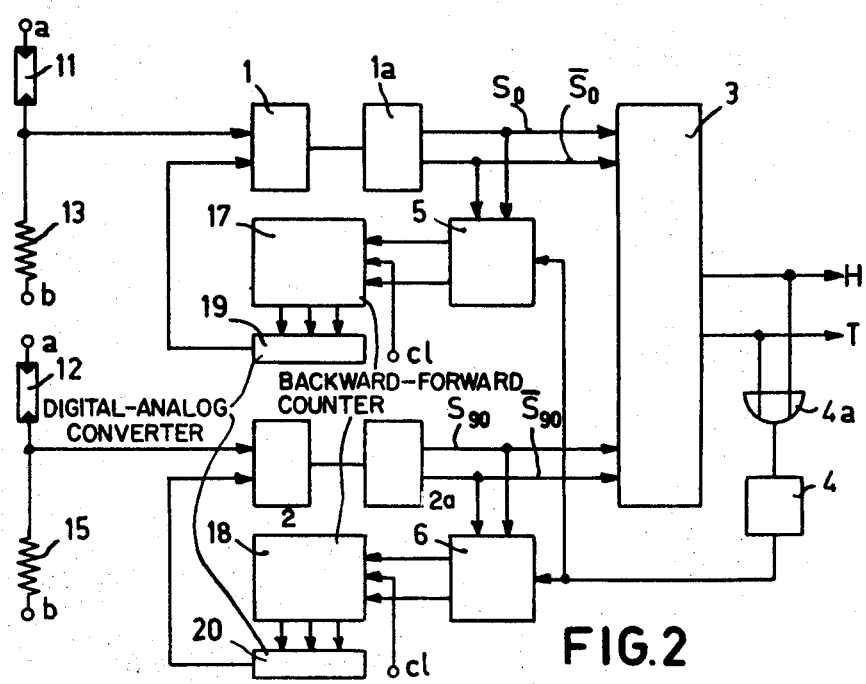
FIG. 2 shows a second device embodying the invention.

FIG. 2 shows a device for a rapid control of the reference-setting signal for a scanning member.

The control signals of the comparison circuits 5 and 6 are applied to AND gate inputs of forward and backward counters 17 and 18 respectively. A clock-pulse signal cl is also applied thereto from a clock-pulse generator (not shown). When a control signal appears with positive or negative polarity, clock-pulses are applied through an AND gate input to the counters 17 or 18 respectively, which counts the pulses forwardly or backwardly in dependence upon the polarity of the control signal. The positions of the counters 17 and 18 are converted in digital-analogue converters 19 and 20 respectively into an analogue reference-setting voltage applied, to the input of a difference amplifier 1 or 2 respectively. This provides a very fast adaptation of the reference-setting signal for the scanning members so that the asymmetry due to local soiling of measuring rules is also eliminated. In connection with said possibility of fast adaptation it should be noted that such a system may also be employed in laser-measuring systems, in which the laser signal comprises, apart from the main mode, one weak higher or lower axial mode, due to which local modulation differences of the interference pattern may occur. The influence of these local modulation differences can be suppressed by such a fast control system.

FIG. 3 shows schematically the parts 4a, 4, 5 (or 6) of the device according to the invention. The OR gate 4a is formed by the transistor $T_1$, followed by an amplifying stage having a transistor $T_2$. The terminals 30 and 31 form the inputs to which the forward- and backward-counting outputs T and H of the discriminator 3 are connected. The OR gate is followed by the rectifying circuit 4 comprising a diode D an an RC circuit, followed by an emitter follower formed by a transistor $T_3$. With an adequate charge at the capacitor C the rectified control signal for the comparison circuit 5 (or 6) appears at the terminal 32 (switch S in position $S_2$, see hereinafter). A comparison circuit may be as follows. The control signal of the rectifier 4 is applied to the base of a transistor $T_4$, included in the common emitter lead of two transistors $T_5$ and $T_6$. The bases thereof receive the respective signals $S_o$, $\bar{S}_o$ ($S_{90}$, $\bar{S}_{90}$). The RC circuits form low band-pass filters. They may be omitted, since a motor 7 (or 8) itself has a low band-pass filter characteristic. In the event of asymmetry of the signals $S_o$, $\bar{S}_o$ ($S_{90}$, $\bar{S}_{90}$) a control signal for the motor appears either at the collector of the transistor $T_5$ or at the collector of the transistor $T_6$ in accordance with the sense of the asymmetry. The motor is caused to rotate to the left or to the right so that the cursor of the potentiometer is moved up or down.

It should be noted that in practice it may be necessary to add a starting circuit. When the whole system is switched off, the motors 7 and 8 of the embodiment shown in FIG. 1 come to a standstill so that the potentiometers 9 and 10 remain in their positions at the end of the working day. When the system is switched on next day the conditions may be so different that this setting is quite wrong, even to the extent that due to extreme asymmetry no counting pulses are produced and the control therefore does not become operative.

If no special elements are used, the counters (17, 18) of the embodiment of FIG. 2 fall into an arbitrary position, when switched on. This may also bring about failure to operate.

This may be simply remedied by the addition of a switch S, shown in FIG. 3. If switch S is set in the position $S_1$, when the machine is put into operation, motion of the pickup produces an adequate voltage at point 33 between the resistors $R_1$ and $R_2$ as stated above, counting however, pulses may still be lacking. After a short time the symmetry is adjusted and counting pulses will appear so that S can be switched to the normal position $S_2$.

What is claimed is:

1. A device for resolving the displacement of an object, comprising at least two scanning member means for providing relatively phase-shifted alternating signals in response to motion of the object, a signal-adjustable voltage standard for each scanning member, a separate differential amplifier means coupled to each scanner and to the corresponding voltage standard, a separate square wave pulse shaper connected to the output of each differential amplifier, a separate comparator means connected to the output of each pulse shaper for providing an adjusting signal to each voltage standard corresponding to the asymmetry of the corresponding square wave in response to an enabling signal, a discriminator connected to the output of both square wave pulse shapers for providing pulses having a frequency proportional to displacement on two separate output terminals each corresponding to a different direction of displacement. OR gate means connected to both output terminals of the discriminator for providing output pulses corresponding to both directions of displacement, and rectifier means connected to the output of the OR gate means for providing an enabling signal to each of the comparator means in response to the OR gate output.

2. A device as claimed in claim 1, wherein the signal-adjustable voltage standard for each scanning member comprises a potentiometer, and a motor mechanically connected to the cursor of the potentiometer and electrically connected to the output of the comparator.

3. A device as claimed in claim 1, wherein the signal-adjustable voltage standard for each scanning member comprises a forward backward counter connected to the output of the corresponding comparator for providing a digital signal corresponding to the asymmetry of the associated pulse shaper, and a separate digital-to-analogue converter connected to the output of each forward backward counter for providing each voltage standard.

4. A device as claimed in claim 1, further comprising switch means connected to a bias voltage for selectively providing an enabling voltage for all the comparators.